US012747936B2

(12) United States Patent
Brüggemann et al.

(10) Patent No.: US 12,747,936 B2
(45) Date of Patent: Sep. 29, 2026

(54) LEVEL SENSOR CONSISTING OF TWO INTEGRAL UNITS

(71) Applicant: Continental Automotive Technologies GmbH, Hannover (DE)

(72) Inventors: Stephan Brüggemann, Frankfurt am Main (DE); Jörg Eckrich, Wiesbaden (DE); Thomas Krohn, Schwalbach (DE)

(73) Assignee: AUMOVIO Germany GmbH, Frankfurt am Main (DE)

(*) Notice: Subject to any disclaimer, the term of this patent is extended or adjusted under 35 U.S.C. 154(b) by 270 days.

(21) Appl. No.: 18/258,273

(22) PCT Filed: Dec. 7, 2021

(86) PCT No.: PCT/DE2021/200247

§ 371 (c)(1),
(2) Date: Jun. 19, 2023

(87) PCT Pub. No.: WO2022/128017

PCT Pub. Date: Jun. 23, 2022

(65) Prior Publication Data

US 2024/0053132 A1 Feb. 15, 2024

(30) Foreign Application Priority Data

Dec. 18, 2020 (DE) ..................... 10 2020 216 344.8

(51) Int. Cl.
*G01B 3/56* (2006.01)
*G01D 5/12* (2006.01)
(Continued)

(52) U.S. Cl.
CPC ............... *G01B 3/56* (2013.01); *G01D 5/145* (2013.01); *G01D 11/245* (2013.01); *G01D 5/12* (2013.01)

(58) Field of Classification Search
CPC ........ G01D 11/245; G01D 5/145; G01D 5/12; G01D 11/02; G01D 5/142; G01D 11/30; G01D 11/24; G01B 7/30; G01B 7/003
(Continued)

(56) References Cited

U.S. PATENT DOCUMENTS 5,631,085 A 5/1997 Gebauer
6,316,935 B1 * 11/2001 Vanzuilen .............. G01D 5/145 324/207.21

(Continued)

FOREIGN PATENT DOCUMENTS

CN 106441377 A 2/2017
CN 107076573 A 8/2017

(Continued)

OTHER PUBLICATIONS

Klaus (Year: 2023).*

(Continued)

*Primary Examiner* — Peter J Macchiarolo

(57) ABSTRACT

A sensor which has a lever unit which is rotationally, deflectably mounted in a bearing of a base unit, wherein the lever unit has a shaft, which is mounted by way of its shaft bearing portion in the bearing, and has a lever connected to said shaft, wherein the shaft has an encoder, and wherein the base unit has at least one sensor element which detects the encoder, wherein the lever unit is formed substantially, with the exception of the encoder, as a single piece from plastics, and that a housing of the base unit, in which at least the sensor element is arranged, is formed as a single piece from plastics together with the bearing of the base unit.

11 Claims, 5 Drawing Sheets

(51) Int. Cl.
*G01D 5/14* (2006.01)
*G01D 11/24* (2006.01)

(58) Field of Classification Search
USPC .............. 33/538; 73/431, 514.31, 1.75, 1.79, 73/514.16; 324/207.25, 207.2
See application file for complete search history.

(56) References Cited

U.S. PATENT DOCUMENTS

| | | | | |
|---|---|---|---|---|
| 8,008,910 | B2 * | 8/2011 | Booth | E05F 15/622 324/207.2 |
| 9,134,200 | B2 * | 9/2015 | Waite | G01M 17/04 |
| 10,240,946 | B2 * | 3/2019 | Sticksel | G01D 5/12 |
| 10,288,529 | B2 * | 5/2019 | Waite | G01D 5/145 |
| 10,295,370 | B2 * | 5/2019 | Kotlaja | G01D 5/145 |
| 11,035,696 | B2 * | 6/2021 | Haverkamp | G01D 5/145 |
| 11,982,546 | B2 * | 5/2024 | Suyama | G01B 7/30 |
| 12,270,640 | B2 * | 4/2025 | Wilson | B29C 45/14778 |
| 2006/0273784 | A1 * | 12/2006 | Godoy | G01D 5/145 324/207.2 |
| 2006/0274485 | A1 * | 12/2006 | Godoy | G01D 11/245 361/679.01 |
| 2013/0078423 | A1 | 3/2013 | Sutou et al. | |
| 2015/0185005 | A1 | 7/2015 | Bartscht et al. | |
| 2017/0276511 | A1 * | 9/2017 | Kotlaja | G01D 5/12 |

FOREIGN PATENT DOCUMENTS

| | | | | |
|---|---|---|---|---|
| CN | 107849971 | A | 3/2018 | |
| DE | 3842566 | A1 * | 7/1989 | H01R 39/381 |
| DE | 102007034099 | A1 | 1/2009 | |
| DE | 102011118775 | B3 | 4/2013 | |
| DE | 102011118773 | A1 | 5/2013 | |
| DE | 102012106021 | A1 | 5/2014 | |
| DE | 102007063683 | B4 | 11/2015 | |
| DE | 102014218684 | A1 | 3/2016 | |
| DE | 102015218425 | A1 | 3/2016 | |
| DE | 102019200029 | A1 * | 7/2019 | G01D 11/02 |
| DE | 102011118773 | B4 * | 10/2023 | G01D 11/245 |
| EP | 1729094 | A1 | 12/2006 | |
| EP | 3296699 | A1 * | 3/2018 | G01D 5/24442 |
| JP | H06200437 | A | 7/1994 | |
| JP | 2013071312 | A | 4/2013 | |
| KR | 20170044133 | A | 4/2017 | |
| WO | 2023004384 | A1 | 1/2023 | |

OTHER PUBLICATIONS

Cavallo (Year: 2019).*
Brueggemann (Year: 2017).*
Office Action dated Jul. 1, 2024 of the counterpart Japanese application No. 2023-531642.
EP Examination Report dated Apr. 26, 2024 of the counterpart Europan Application No. 21831213.0.
Decision of Refusal posted on Feb. 3, 2025 for the counterpart Japanese Patent Application No. 2023 to 531642 and machine translation of same.
European Examination Report dated Mar. 18, 2025 corresponding with European Patent Application 21831213.0.
Examination Report from the Intellectual Property India dated Dec. 1, 2025 for the counterpart Indian Application No. 202337040453.
Chinese Office Action dated Jul. 30, 2025 for the counterpart Chinese Patent Application No. 202180082821.2 and machine translation of same.
Korean Office Action dated Aug. 18, 2025 for the counterpart Korean Patent Application No. 10-2023-7017521 and machine translation of same.
International Search Report dated Mar. 17, 2022 of International Application PCT/DE2021/200247.
German Office Action dated Oct. 4, 2021 of counterpart DE Application 10 2020 216 344.8.
Chinese Second Office Action dated Feb. 24, 2026 for the counterpart Chinese Patent Application No. 202180082821.2 and machine translation of same.
Mexican 1st substantive exam dated Jun. 16, 2026 for the counterpart Mexican Patent Application No. MX/a/2023/006812 and machine translation of same.
Notice of Final Rejection dated Jun. 22, 2026 for the counterpart Korean Patent Application No. 10-2023-7017521 and machine translation of same.
Chinese Notice of Allowance dated Jul. 7, 2026 for the counterpart Chinese Patent Application No. 202180082821.2 and machine translation of same.

* cited by examiner

LEVEL SENSOR CONSISTING OF TWO INTEGRAL UNITS

CROSS-REFERENCE TO RELATED APPLICATIONS

The present application is a National Stage Application under 35 U.S.C. § 371 of International Patent Application No. PCT/DE2021/200247 filed on Dec. 7, 2021, and claims priority from German Patent Application No. 10 2020 216 344.8 filed on Dec. 18, 2020, in the German Patent and Trade Mark Office, the disclosures of which are herein incorporated by reference in their entireties.

BACKGROUND

Field

Embodiments of the present application relate to a sensor, and more particularly to a chassis position sensor for detecting the relative deflection and/or position between a vehicle chassis and a running gear unit by way of an angle measurement performed by the sensor.

SUMMARY

Aspects and objects of embodiments of the present application relate to a sensor comprising a base unit and a lever unit, wherein the sensor is relatively inexpensive and/or robust and/or compact and/or has relatively precise measurement capability.

According to an aspect of an embodiment, there is provided a sensor which has a lever unit which is rotationally deflectably mounted in a bearing of a base unit, wherein the lever unit has a shaft, which is mounted by way of its shaft bearing portion in the bearing, and has a lever connected to said shaft, wherein the shaft has an encoder, and wherein the base unit has at least one sensor element which detects the encoder or the magnetic field that is generated and/or modulated by said encoder.

It is preferred that the bearing of the base unit has multiple detent means, in particular detent hooks and/or detent projections, which are arranged in encircling fashion on the inner shell of the bearing and which are formed as a single piece with the bearing, and wherein said detent means directly or indirectly hold and/or guide the shaft bearing portion.

The statement that the shaft bearing portion is indirectly held and/or guided by the detent means is preferably to be understood to mean that a snap ring or some other connecting means that forms or makes possible a mutual form fit between the bearing and the shaft bearing portion is held and/or guided and/or mounted by the detent means.

The bearing of the base unit is expediently of substantially pot-shaped or hollow cylindrical configuration.

The sensor is preferably configured as an angle sensor for measuring an angle of relative rotation between the lever unit and base unit.

The sensor is expediently configured as a chassis position sensor for detecting the relative deflection and/or position between a vehicle chassis and a running gear unit by way of an angle measurement performed by the sensor. For this purpose, the sensor has, in particular, a lever unit which is rotationally deflectably mounted in a bearing of a base unit, wherein the lever unit has a shaft, which is mounted by way of its shaft bearing portion in the bearing, and has a lever, which is particularly preferably arranged substantially at right angles with respect to said shaft.

It is preferred that the lever unit is formed substantially, with the exception of the encoder, as a single piece from plastics, and that a housing of the base unit, in which at least the sensor element is arranged, is formed as a single piece from plastics together with the bearing of the base unit.

The preferably substantially single-piece lever unit, with the exception of the encoder, preferably also has a connecting element, which is integrally connected to the lever of the lever unit, for coupling to a motor vehicle component.

The shaft bearing portion, in particular the entire lever unit, is preferably formed from carbon-fiber-reinforced and/or glass-fiber-reinforced plastics. The lever unit and the base unit, or the respective housing, are preferably formed from PBT. Said housings are in each case configured as a single piece and formed in one injection molding operation.

It is expedient either for the shaft bearing portion, and in this case in particular the entire lever unit, to be formed from carbon-fiber-reinforced plastics, and for the bearing of the base unit, in particular the bearing and the housing of the base unit together, to be formed from glass-fiber-reinforced plastics, or alternatively preferably for the shaft bearing portion, and in this case in particular the entire lever unit, to be formed from glass-fiber-reinforced plastics, and for the bearing of the base unit, in particular the bearing and the housing of the base unit together, to be formed from carbon-fiber-reinforced plastics. In particular, the two units are not both composed of carbon-fiber-reinforced plastics, because this could possibly lead to electrical coupling owing to the same selection of material.

An encoder is preferably to be understood to mean a permanent magnet which is in particular substantially cylindrical and which, with respect to the shaft, is magnetized substantially in a radial direction, particularly preferably is magnetized diametrically. The encoder is alternatively preferably configured as a non-permanently magnetic, ferromagnetic target.

The sensor element is preferably to be understood to mean a magnetic field sensor element, in particular a Hall element or a magnetoresistive magnetic field sensor element. The sensor element alternatively preferably has at least one electrically energized conductor loop and detects the magnetic field that is modulated by the encoder, or an electrical voltage in the conductor loop that is induced by the encoder. In particular, the sensor element has at least one generator conductor loop for generating a magnetic field, and one or two receiver conductor loops in which the resulting induced electrical voltage is detected in a manner dependent on the magnetic field resulting from the generator conductor loop and the encoder.

The sensor element expediently detects the magnetic field of the encoder or the magnetic field modulated by the encoder.

The bearing of the base unit, in particular the entire base unit, is preferably formed from glass-fiber-reinforced plastics.

The preferred formation of the shaft bearing portion and/or of the bearing from carbon-fiber-reinforced plastics has the effect of reducing the surface friction that arises between the shaft bearing portion and the bearing as a result of the abrasion of plastics or carbon fibers.

In particular, the sensor is configured such that no grease or no additional lubricant is introduced in the bearing or at the shaft bearing portion.

It is alternatively preferable for the bearing of the base unit, and/or the shaft bearing portion, to have additional lubricant or grease.

The detent means are preferably configured as detent hooks and/or detent projections and/or detent lugs.

It is preferred that in each case two mutually spaced-apart rows of detent means are arranged in encircling fashion on the inner shell of the bearing so as to be formed integrally with the bearing, and in particular, said two rows of detent means are configured to be substantially parallel to one another. Said two rows of detent means particularly preferably form a groove, very particularly preferably an interrupted groove, on the inner shell of the bearing, wherein said groove very particularly expediently does not project into the inner shell of the bearing but is formed exclusively by the two rows of, in particular protruding, detent means.

The shaft bearing portion of the lever unit preferably has a groove in which a snap ring is arranged, which snap ring is configured such that, at the bearing side, it can be received or is received or is supported substantially in form-fitting fashion by the detent means or the two rows of detent means.

The snap ring is preferably substantially round/circular or is alternatively preferably configured to be not circular but substantially oval or oval/round, and at the same time of undulating configuration. The ring is in this case expediently of interrupted configuration.

It is preferred that the detent means of the at least one row each have a width along the peripheral direction or the inner circumference or the peripheral line or an inner circumferential line, on the inner shell of the bearing, which is smaller than or substantially equal to the spacings to the directly adjacent detent means.

It is preferred that the detent means of the at least one row are each configured and arranged to be substantially uniformly spaced apart, along the peripheral direction or the inner circumference or the peripheral line or an inner circumferential line, on the inner shell of the bearing, from the respectively adjacent detent means, wherein the at least one row of detent means, or each of the two mutually spaced-apart rows of detent means, each particularly preferably have six detent means.

It is expedient that the encoder is arranged at the end of the shaft on the side averted from the lever, wherein said encoder is held exclusively in form-fitting fashion, and is in particular engaged around laterally, particularly preferably over its full circumference, by the plastics body of the shaft. For this purpose, the shaft particularly preferably has two or three or more fingers or projections which fix the encoder laterally in form-fitting fashion, in particular over the full height or axial extent of the encoder, wherein it is very particularly preferred that none of said fingers or projections supports the encoder from below.

The encoder is expediently not connected to the shaft by adhesive bonding.

It is preferred that the housing of the base unit has at least two fastening means which each comprise a thread or a substantially star-shaped recess, wherein the fastening means are configured such that a screw can be screwed into the material of the corresponding fastening means by virtue of said screw at least partially cutting into the material of said fastening means. The fastening means are in particular composed of plastic and connected integrally to the housing of the base unit or formed as a single piece with said housing from plastics. It is alternatively preferred that one of the two fastening means is configured as an element that can be inserted in form-fitting fashion into a recess of a motor vehicle component, which element is not screwed in and is configured in particular as an insertion lug or insertable positioning aid, for example as a mandrel, which has a for example star-shaped or polygonal circumferential shape or such a profile.

The housing of the base unit preferably has at least two recesses which are generated during the production of the housing and which each expose a part of the sensor element and/or of a signal processing element. In particular, the overmolded part of the housing of the sensor element and/or of the housing of the signal processing element is laser-activated in the region around said recesses, in particular at least 1 mm around said recesses, or over the entire surface adjoining the recess, in particular before the overmolding process. This in particular increases the adhesion or sealing action between the housing and the sensor element and the signal processing element respectively.

It is preferred that the shaft of the lever unit has a collar, which is configured to engage around, and be supported axially on, an encircling edge or an encircling upper rim of the substantially hollow cylindrical bearing. In particular, the collar and the encircling upper edge of the bearing are configured such that the collar can engage with detent action with and/or be fixed/connected in form-fitting fashion to, the edge. The bearing particularly preferably has, on its outer shell below the upper edge, a groove into which, for example, a lubricant or grease is introduced and into which an annular seal is very particularly preferably introduced, whereby the collar of the lever unit is sealed with respect to the bearing.

The lever unit expediently has the collar at the transition between the lever and the shaft.

The sensor is preferably configured as an angle sensor and/or ride height sensor and/or chassis position sensor.

The shaft preferably has a substantially central recess that extends as a blind bore from the side of the lever in the direction of the base unit, wherein, in particular, said central recess is at least partially of cylindrical and/or funnel-shaped and/or tapering form.

The base unit expediently comprises a sensor element and a signal processing element, which are each electrically contacted with and fastened to a leadframe. In particular, the leadframe projects with two parallel terminal regions into a plug connector. The plug connector is expediently part of the housing of the base unit, and the sensor element, the signal processing element and a part of the leadframe are embedded or at least partially embedded in the housing, or the housing is formed during the course of the overmolding of said elements and of a part of the leadframe in a single injection molding operation, wherein the bearing, the plug connector and the fastening means are particularly preferably simultaneously formed as part of the housing.

The housing of the base unit preferably has at least two or three recesses which are generated during the production of the housing and which each expose a part of the sensor element and of the signal processing element respectively, and in particular, the sensor element, or the integrated sensor and signal processing element, is exposed by two oppositely situated recesses. The overmolded part of the housing of the sensor element and/or of the signal processing element, that is to say the dedicated housing of each of said elements, is laser-activated, in particular before the overmolding process, in the region around said recesses. Furthermore, the housing of the base unit particularly preferably has additional, expediently two, centering recesses.

The sensor element and the signal processing element are expediently formed integrally as one structural element.

DETAILED DESCRIPTION

Figure 1:
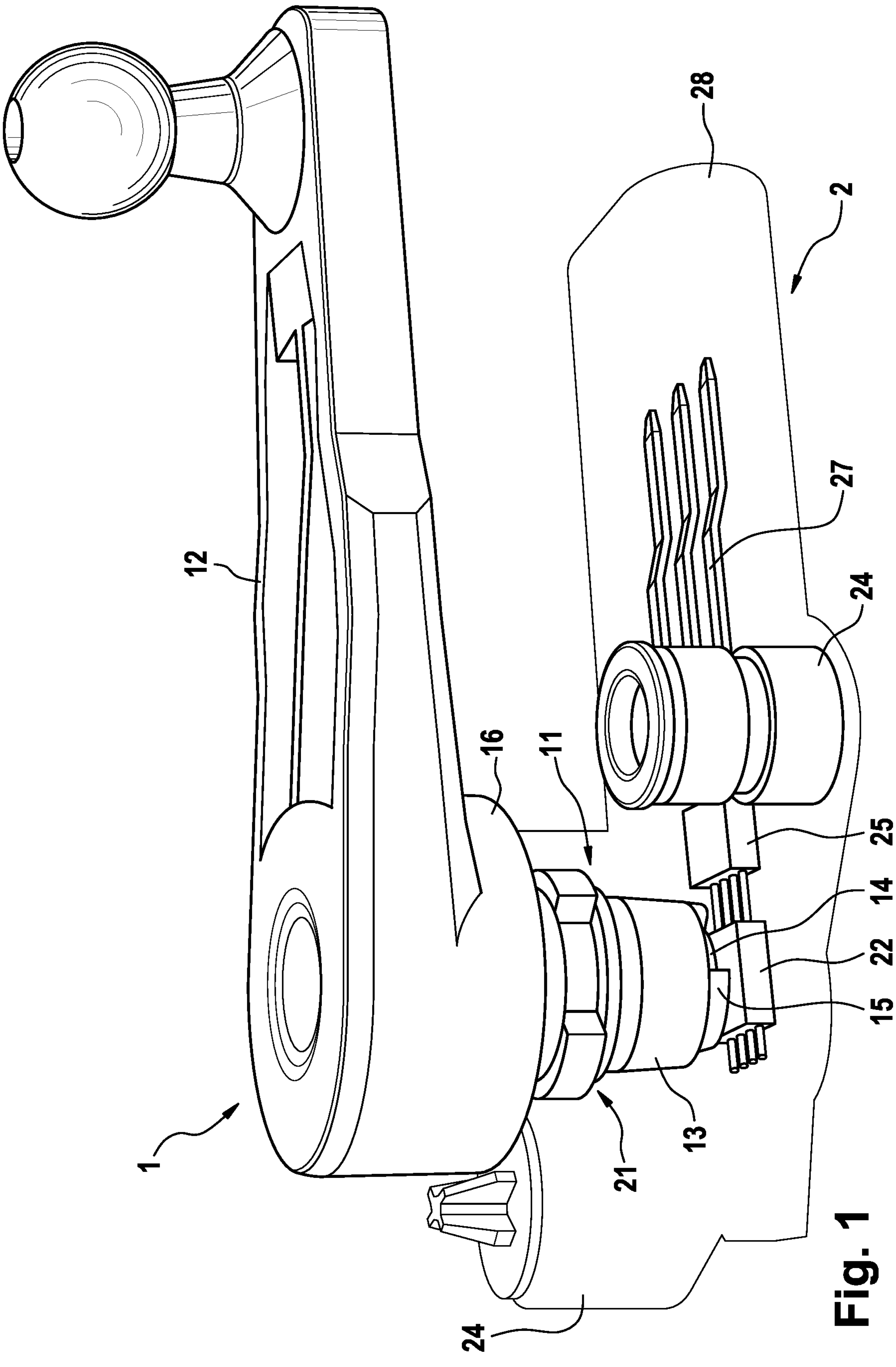
FIG. 1 is a diagram illustrating a sensor, according to an embodiment.

FIG. 1 shows an exemplary embodiment of the sensor. Here, the sensor comprises a lever unit 1 and a base unit 2. The lever unit is composed of a lever 12 on which a shaft 11 with a shaft bearing portion 13 is arranged, wherein the shaft bearing portion 13 is inserted into and mounted in a bearing 21 of the base unit. Arranged at the lower end of the shaft bearing portion 13 is an encoder 14, which is held exclusively in form-fitting fashion by exemplary projections or fingers 15 of the shaft bearing portion. These projections 15 each engage around said encoder laterally over a full height, but do not engage under or surround the encoder 14. At the transition between lever 12 and shaft 11, the lever unit 1 has a collar 16 that engages around the upper encircling edge of the bearing 21 of the base unit 2. With the exception of the encoder 14, the lever unit 1 is, in the example, formed as a single piece from carbon-fiber-reinforced plastics, specifically in a single injection molding operation.

At least the housing of the base unit 2, in which the sensor element 22 and the signal processing element 25 are arranged so as to be in contact with and fastened to the lead frame 27 and to which the fastening means 24 are attached, and the bearing 21 of the base element are for example formed jointly as a single piece composed of glass-fiber-reinforced plastics, specifically in a single injection molding operation. The housing of the base unit 2 furthermore forms, together with the lead frame as contacts, a plug connector 28.

One of the fastening means 24 of the base unit, in the foreground in FIG. 1, has an injection-molded sleeve composed of metal for the screw connection of the sensor to a vehicle component (not illustrated). The rear fastening means 24 is configured for example as a mandrel with a star-shaped profile for insertion into a receptacle of the vehicle component (not illustrated). The bearing 21 of the base element has detent means 23 by which the shaft bearing unit is guided or mounted, for example indirectly via a snap ring.

Figure 4:
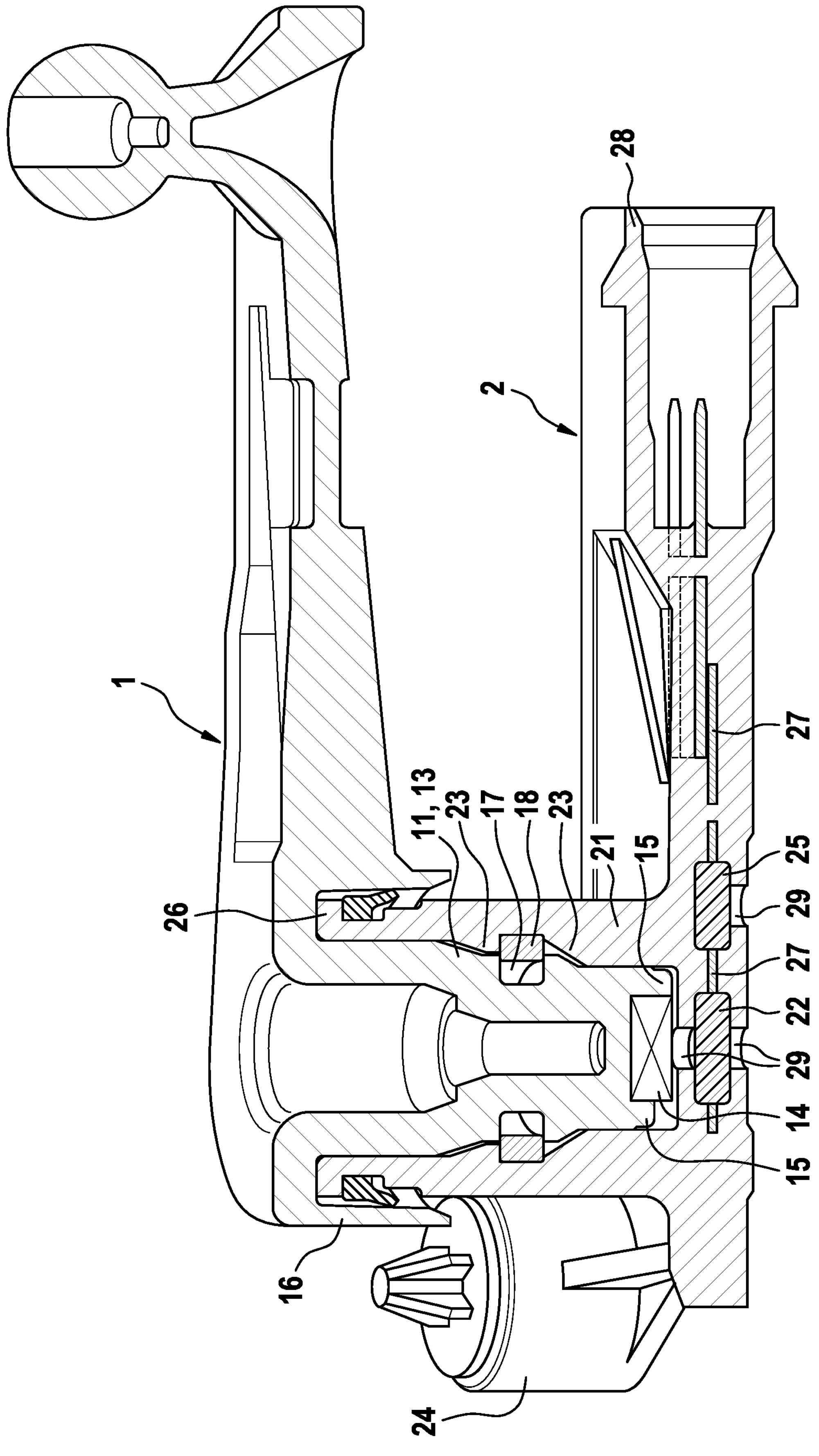
FIG. 4 is a sectional view of the sensor illustrated in FIG. 1.

FIG. 4 illustrates the exemplary embodiment from FIG. 1 in section, with a snap ring 18 being mounted, at the side of the lever unit 1, in a groove 17 of the shaft bearing unit 13, and the snap ring 18 in this case likewise being guided or mounted by the detent means 23 of the bearing 21 of the base unit 2. Here, detent means 23 are integrally connected to the bearing 21 and are arranged on the inner shell thereof in encircling fashion along an internal circumferential line, or for example on substantially two mutually parallel internal circumferential lines, whereby the detent means 23 form an interrupted groove on the inner shell of the bearing 21.

The housing of the base unit 2 has three recesses 29 which are generated during the production of the housing and which expose a part of the sensor element 22 on both sides and expose a part of the signal processing element 25 on one side. In the region around these recesses 29, the overmolded part of the housing of the sensor element 22 and of the signal processing element 25 respectively, that is to say the dedicated housing of each of said elements, is laser-activated, whereby a sealed connection between the element housings and the housing of the base unit 2 is ensured. The collar 16 of the lever unit 1 engages around the encircling upper edge 26 of the bearing 21. The encoder 14 is arranged at the lower end of the shaft 11 and is held exclusively in form-fitting fashion by virtue of the fact that it is engaged around laterally, wherein one of the projections 15 or fingers of the shaft is illustrated in this section.

Figure 2:
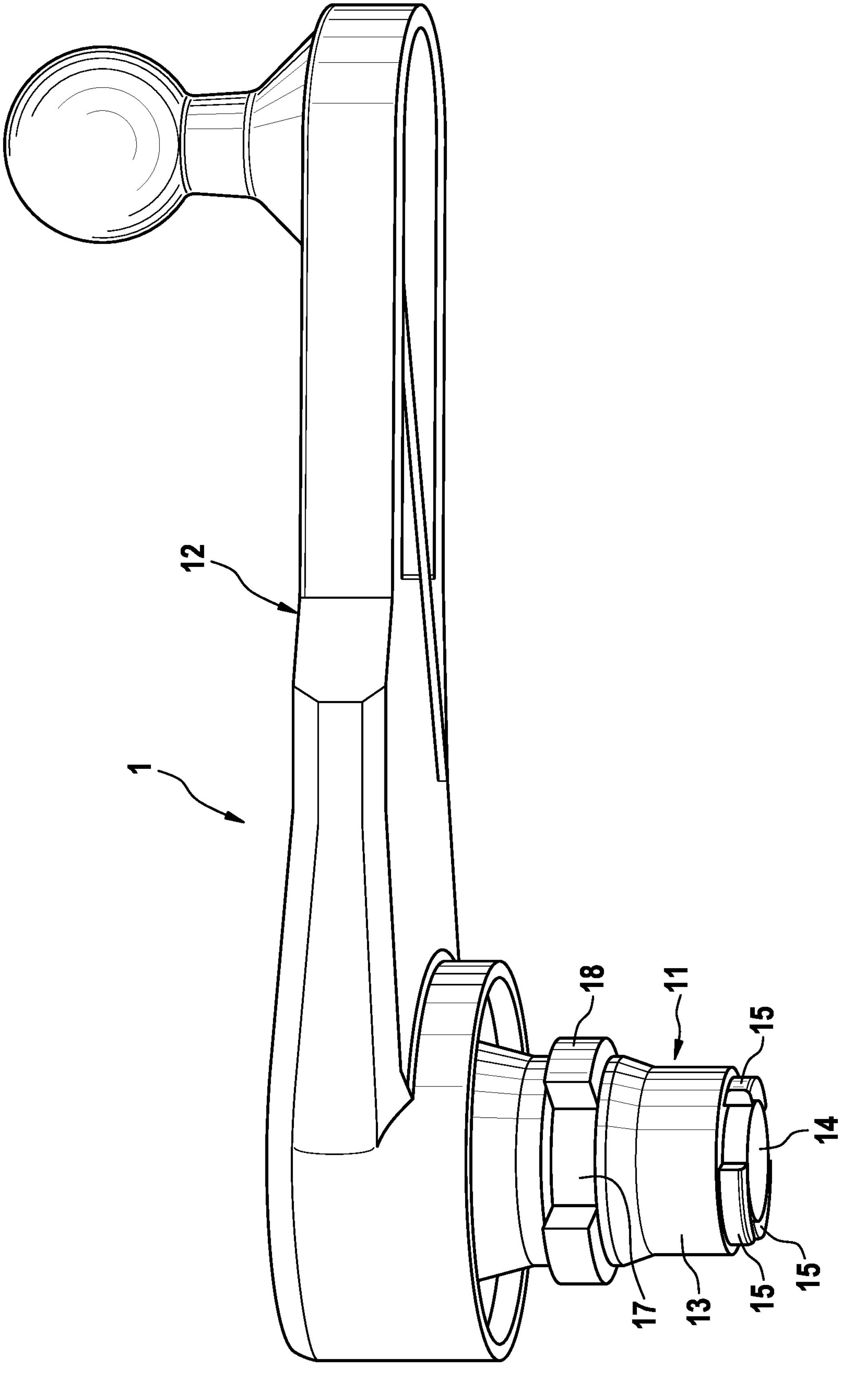
FIG. 2 is a diagram illustrating a lever unit, according to an embodiment.

FIG. 2 shows the exemplary lever unit 1 with the lever 12, which is formed substantially at right angles to the shaft 11. The shaft 11 comprises the shaft bearing portion 13, which can be inserted into, and is mounted rotatably in, the bearing (not illustrated) of the base unit. The shaft bearing portion 13 has an encircling groove 17 to which the snap ring 18 is connectable or into which groove said snap ring engages or protrudes. At the lower end, or the end averted from the lever, of the shaft 11, the encoder 14 is held and fixed exclusively in form-fitting fashion by means of the projections or fingers 15 which each engage laterally around the encoder 14. Here, the projections or fingers 15 protrude downward from the shaft 11 substantially to an extent equal to the height of the encoder 14 in this direction.

Figure 3:
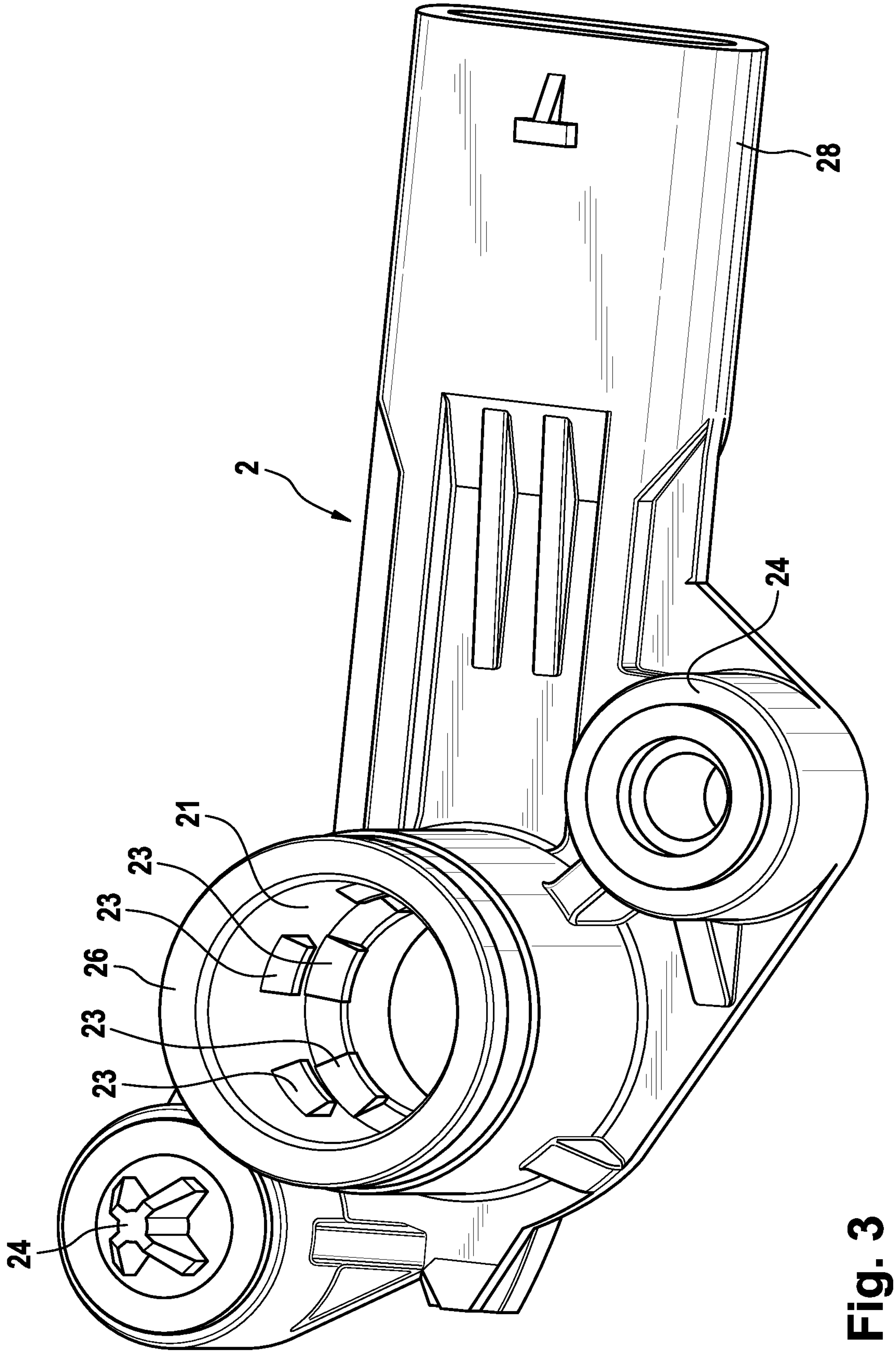
FIG. 3 is a diagram illustrating a base unit, according to an embodiment.

FIG. 3 illustrates, by way of example, the base unit 2, which has a bearing 21, two fastening means 24 of the base unit, and the plug connector 28.

The bearing 21 is of substantially pot-shaped or hollow cylindrical configuration and, on its inner shell, has two substantially mutually parallel rows of detent lugs as detent means 23, which together form an interrupted groove on the inner shell of the bearing 21 for the purposes of receiving and/or mounting and/or guiding the snap ring (not illustrated), which in turn engages with the shaft bearing portion (not illustrated) of the lever unit.

Figure 5:
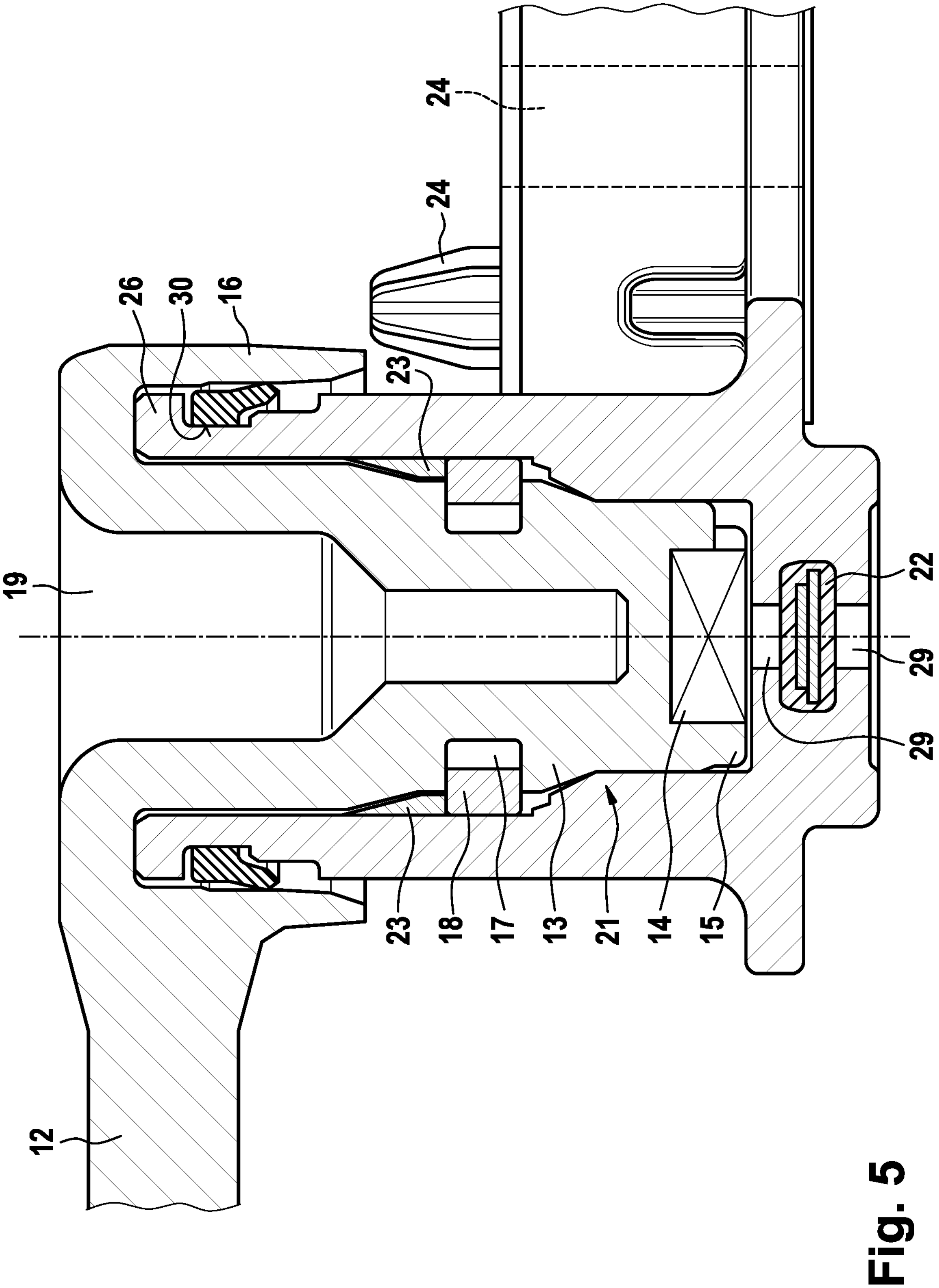
FIG. 5 is a sectional diagram illustrating a bearing and a shaft bearing portion, according to an embodiment.

FIG. 5 shows, by way of example, a section through the bearing 21 of the base unit and the shaft bearing portion 13, mounted therein, of the lever unit. The shaft preferably has a substantially central recess 19, which extends in tapering fashion as a blind bore from the side of the lever 12 in the direction of the base unit.

The shaft of the lever unit furthermore has the collar 16, which is configured to engage around, and be supported axially on, the encircling edge 26 or an encircling upper rim of the substantially hollow cylindrical bearing 21. Here, the collar 16 and the encircling upper edge 26 of the bearing are configured such that the collar can engage with detent action with and/or be fixed/connected in form-fitting fashion to, the edge. In the example, the bearing 21 has, on its outer shell below the upper edge 26, a groove 30 into which, for example, a lubricant or grease is introduced and into which, for example, an annular seal is introduced, whereby the collar 16 of the lever unit is sealed with respect to the bearing 21.

In each case two mutually spaced-apart rows of detent means 23, provided here with different hatching in order to make them more clearly visible, are arranged in encircling fashion on the inner shell of the bearing 21, but are each formed integrally with the bearing, and in the example, these two rows of detent means 23 are configured to be substantially parallel to one another and together form an interrupted groove on the inner shell of the bearing 23, wherein said groove does not project into the inner shell of the bearing but is formed exclusively by the two rows of protruding detent means 23. The snap ring 18 protrudes in each case into said interrupted groove composed of detent means 23 and of a groove 17 on the shaft bearing portion 13, and said snap ring connects the shaft bearing portion 13 and bearing 21 in form-fitting fashion.

The base unit furthermore has two fastening means 24.

The encoder 14 is arranged at the end of the shaft on the side averted from the lever 12, and said encoder 14 is held exclusively in form-fitting fashion, and is engaged around laterally, by the plastics body of the shaft. For this purpose, the shaft has multiple fingers or projections 15 which fix the encoder 14 laterally in form-fitting fashion over its full height or axial extent.

Under the encoder 14, or so as to face and be assigned to same, the sensor element 22 is embedded in the housing of the base unit and is exposed in each case on respectively opposite sides by a recess 29 above and below the sensor element 22, wherein the sensor element housing is laser-activated or laser-roughened in the region around the recess in order to ensure a sealed connection to the injection-molded housing of the base unit.

The invention claimed is:

1. A sensor comprising:

a base, the base comprising:

a bearing; and a sensor arranged in the base; and a lever rotationally deflectably mounted in the bearing, the lever comprising:

a shaft mounted in the bearing and connected to the base; and an encoder, wherein the sensor is configured to detect the encoder, wherein the lever is plastic molded as a single piece, and wherein the base and the bearing are plastic molded as a single piece together wherein the bearing comprises multiple detent hooks and/or detent projections arranged in encircling fashion on an inner shell of the bearing and formed as a single piece with the bearing, wherein the multiple detent hooks and/or detent projections are configured to directly or indirectly hold the shaft wherein the multiple detent hooks and/or detent projections comprise two mutually spaced-apart rows of detent hooks and/or detent projections arranged in encircling fashion on the inner shell of the bearing formed integrally with the bearing, and wherein the two mutually spaced-apart rows are configured to be substantially parallel to one another.

2. The sensor as claimed in claim 1, wherein at least one row of the two mutually spaced-apart rows has a width along a peripheral direction on the inner shell of the bearing that is smaller than spacings to directly adjacent detent hooks and/or detent projections.

3. The sensor as claimed in claim 2, wherein the detent hooks and/or detent projections of the at least one row are each formed and arranged to be substantially uniformly spaced apart, along the peripheral direction on the inner shell of the bearing, from the respectively adjacent detent hooks and/or detent projections, and wherein the at least one row has six detent hooks and/or detent projections.

4. The sensor as claimed in claim 1 wherein the lever unit is formed from carbon-fiber-reinforced plastics.

5. The sensor as claimed in claim 4, wherein the bearing is formed from glass-fiber-reinforced plastics.

6. The sensor as claimed in claim 5, wherein the encoder is arranged at an end of the shaft on a side averted from the lever, and wherein the encoder is held in form-fitting fashion, and is engaged around laterally over its full circumference by the plastics body of the shaft.

7. The sensor as claimed in claim 1, wherein the base comprises two fastening means comprising a thread or a substantially star-shaped recess, and wherein the two fastening means are configured such that a screw can be screwed into material of the corresponding fastening means by virtue of the screw at least partially cutting into the material of the two fastening means.

8. The sensor as claimed in claim 7, wherein the base comprises two recesses that each expose a part of the sensor.

9. The sensor as claimed in claim 8, wherein an overmolded part of the sensor is laser-activated in a region around the two recesses before an overmolding process.

10. The sensor as claimed in claim 1, wherein the shaft comprises a collar configured to engage around, and be supported axially on, an encircling edge of the bearing, and wherein the bearing is substantially hollow cylindrical.

11. The sensor as claimed in claim 1, wherein the sensor is configured as an angle sensor and/or ride height sensor and/or chassis position sensor.

* * * * *